3,380,995
ORGANIC SALTS OBTAINED BY QUATERNIZING THE NITROGEN OF D-GLUCOSAMINE, AND PROCESS FOR THE PREPARATION THEREOF
Alberto Reiner, Via Mentana 23, Como, Italy
No Drawing. Filed Oct. 23, 1965, Ser. No. 504,210
11 Claims. (Cl. 260—211)

The present invention relates to organic salts of D-glucosamine having striking therapeutic characteristics, and to a process for preparing them.

More particularly, the present invention relates to salts of D-glusocamine obtained by quaternizing the nitrogen of D-glucosamine with monophosphoric, diphosphoric or triphosphoric acids which acids are in turn partially esterified with organic compounds having one or more alcoholic groups.

The salts of the present invention are simple salts of D-glucosamine obtained by reacting a free amine base with an acid according to the described techniques, and are not to be confused with phosphoric esters of D-glucosamine.

The salts of the present invention correspond to the general formula:

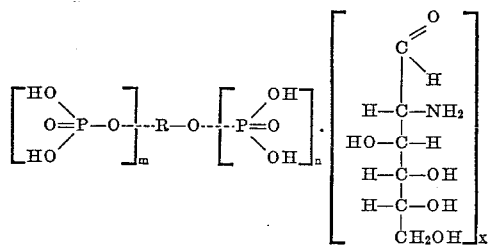

where:

R is an organic radical containing at least one terminal alcoholic group esterfiable with mono-, di-, or triphosphoric acids;
m is zero or 1;
n is an integer between 1 and 3;
x is an integer between 1 and 4.

Where m is zero, R is monovalent; in other cases, R is divalent.

The quaternization takes place according to the following scheme:

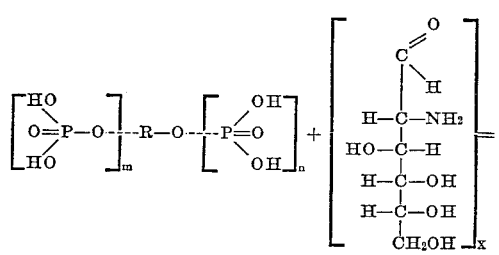

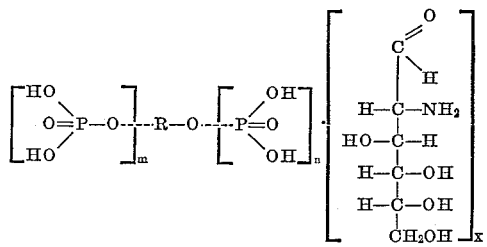

According to the process of the present invention, the starting material D-glucosamine base in its free state having a M.P. of 110° C. and specific rotation of $[\alpha]_D^{20} = +47.5°$ (measured at concentration 1, corresponding to 1 g. in 100 ml. of water), consisting of white crystals very soluble in water. The D-glucosamine base is reacted, in stoichiometric proportions with one of the organic compounds in the form of free acid isolated in a pure state, according to the techniques and conditions disclosed in the examples shown hereinafter by indicative and not limitative way.

The present invention also relates to a process for preparing the aforesaid salts, which comprises the steps of gradually adding small portions of the D-glucosamine base as very pure crystals to stoichiometric proportions of phosphoric esters in aqueous solutions of about 20% by weight concentration by stirring, at a temperature lower than 40° C.; measuring at regular intervals (by a potentiometric or equivalent system) the pH of the reaction mixture, adding if necessary additional phosphoric acid in order to keep the pH below the predetermined values; maintaining under stirring during an hour after the last addition; filtering and subjecting the filtered reaction mixture to pre-cooling at a predetermined temperature; thereafter lyophilizing the pre-cooled reaction mixture according to known techniques.

By way of illustration the following examples are set forth: they are not limitative and their results are summarized in Table 1. All the parts and percentages are by weight.

Examples 1–11

In a reaction vessel kept in a thermostatic bath there were placed the stated amounts of the partially esterfied phosphoric acid selected, in each case, in the form of about 20% aqueous solutions.

The stated amounts of D-glucosamine base having the composition C=40.21%; H=7.3%; N=7.79%; O=44.6% (theoretical: C=40.22%; H=7.31% N=7.82%; O=44.65%), were added over a period varying from 30 to 90 minutes, in small portions, with stirring, at the stated temperatures. During the addition, the pH of the reaction mixture was repeatedly measured, since if it was higher than the stated values, additional amounts of the partially esterified phosphoric acid could be added, if necessary. When the addition was completed, the mixture was maintained under stirring for 1 hour, and then diluted with water to obtain solutions of 10% concentration. Thereafter, the mixture was subjected to the pre-cooling step at the stated temperature and for the stated period, after which is was subjected to lyophilization in an autoclave under vacuum, according to known techniques. All the salts so obtained are hygroscopic and very soluble in water; they have the physical characteristics recorded in the Table 1 for each example.

TABLE 1

| Ex. No. | Esterified acid, weight thereof (g.) | Base weight (g.) | Reaction temper. (° C.) | pH | Pre-cooling temper. (° C.) | Pre-cooling time (hrs.) | Obtained salt |
|---|---|---|---|---|---|---|---|
| 1 | Ethanol-beta-amine-phosphoric acid, 1.41 g. | 3.58 | 27 | 6.45 | −35 | 8 | Ethanol-beta-amine-phosphate of bis-D-glucosamine. |
| 2 | Aneurine chloride monophosphoric ester, 4 g. | 1.8 | 20–35 | 5.13 | −30 | 10 | Aneurine chloride ester monophosphate of mono-D-glucosamine. |
| 3 | Aneurine chloride monophosphoric ester, 4 g. | 3.6 | 20 | 5.84 | −35 | 10 | Aneurine chloride ester monophosphate of bis-D-glucosamine. |
| 4 | Adenosine-5-mono-phosphoric acid 3.47 g. | 3.6 | 25 | 5.91 | −40 | 18 | Adenosine-5-monophosphate of bis-D-glucosamine. |
| 5 | 1,6-diphosphric fructose, 3.4 g | 3.6 | 20 | 4.45 | −40 | 20 | Fructose-1,6-diphosphate of bis-D-glucosamine. |
| 6 | 1,6-diphosphoric fructose, 1.7 g | 3.6 | 25 | 5.91 | −40 | 20 | Fructose-1,6-diphosphate of tetrakis-D-glucosamine. |
| 7 | Cocarboxylase, 2 g | 1.5 | 29–30 | 5.9 | −35 | 10 | Cocarboxylate of bis-D-glucosamine. |
| 8 | Cocarboxylase, 2 g | 0.75 | 29–30 | 4.5 | −35 | 10 | Cocarboxylate of mono-D-glucosamine. |
| 9 | Adenosine-tri-phosphoric acid, 2.53 g | 0.9 | 28 | 5.74 | −40 | 18 | Adenosine-tri-phosphate of mono-D-glucosamine. |
| 10 | Adenosine-tri-phosphoric acid, 2.53 g | 1.8 | 29 | 6.25 | −40 | 18 | Adenosine-tri-phosphate of bis-D-glucosamine. |
| 11 | Adenosine-tri-phosphoric acid, 2.53 g | 2.7 | 28 | 6.55 | −40 | 18 | Adenosine-tri-phosphate of tris-D-glucosamine. |

| Ex. No. | Percent yield, empirical formula, color of microcrystals | | Percent Analysis | | | |
|---|---|---|---|---|---|---|
| | | | C | H | N | P |
| 1 | 98%, $C_{14}H_{34}N_3O_{14}P$, white | Calc | 33.67 | 6.864 | 8.413 | 6.202 |
| | | Found | 33.1 | 6.5 | 8.2 | 6.19 |
| 2 | 98%, $C_{18}H_{31}N_5O_9$ PClS, white | Calc | 38.61 | 5.58 | 12.05 | 5.33 |
| | | Found | 38.2 | 5.56 | 12.1 | 5.49 |
| 3 | 97%, $C_{24}H_{44}N_6O_{14}$ PClS, straw-colored | Calc | 39 | 6.001 | 11 375 | 4.91 |
| | | Found | 38.875 | 6 | 11.29 | 4.11 |
| 4 | 99%, $C_{22}H_{41}N_7O_{17}P$, citr.-yellow | Calc | 37.445 | 5.715 | 13.9 | 4.39 |
| | | Found | 37.25 | 5.695 | 13.8 | 4.32 |
| 5 | 95%, $C_{18}H_{40}N_2O_{22}P_2$, light hazel-brown | Calc | 30.95 | 5.77 | 4.011 | 8.871 |
| | | Found | 30.9 | 5.72 | 4 | 8.6 |
| 6 | 95%, $C_{30}H_{66}N_4O_{32}P_2$, light hazel-brown | Calc | 34.09 | 6.296 | 5.305 | 5.862 |
| | | Found | 34 | 6.245 | 5.3 | 5.8 |
| 7 | 96%, $C_{24}H_{45}N_6O_{17}P_2$ ClS, white | Calc | 35.17 | 5.52 | 10.24 | 7.55 |
| | | Found | 35.09 | 5.50 | 10.22 | 7.3 |
| 8 | 95%, $C_{18}H_{32}N_5O_{12}P_2$ ClS, white | Calc | 33.77 | 5.03 | 10.93 | 9.74 |
| | | Found | 33.2 | 5 | 10.89 | 9.57 |
| 9 | 97%, $C_{16}H_{29}N_6O_{18}P_3$, straw-colored | Calc | 28 | 4.25 | 12.24 | 13.54 |
| | | Found | 27.8 | 4.3 | 12.02 | 13.3 |
| 10 | 97%, $C_{22}H_{42}N_7O_{23}P_3$, light citr.-yellow | Calc | 30.52 | 4.89 | 11.33 | 10.74 |
| | | Found | 30.2 | 4.71 | 11.29 | 10.7 |
| 11 | 97%, $C_{29}H_{55}N_8O_{28}P_3$, citr.-yellow | Calc | 32.19 | 5.307 | 10.72 | 8.896 |
| | | Found | 32 | 5.18 | 10.471 | 8.796 |

All the salts of the present invention are pharmaceuticals controlling the dismetabolic energetic states of the hepatic and/or cardiovascular apparatus, to institute a method of cure which unites in a single salt the active principles having hepato-protective action, vitaminic action of $B_1$ type and cardiotrophic action with the D-glucosamine that the organism lacks.

Of course, the practical embodiments of the present invention can vary according to the industrial scale realization and the principles known by those skilled in the art, without departing from the scope of the invention itself.

I claim:
1. Ethanol-beta-amino phosphate of bis-D-glucosamine.
2. Aneurine chloride ester monophosphate of mono-D-glucosamine.
3. Aneurine chloride ester monophosphate of bis-D-glucosamine.
4. Adenosine-5-monophosphate of bis-D-glucosamine.
5. Fructose-1,6-diphosphate of bis-D-glucosamine.
6. Fructose-1,6-diphosphate of tetrakis-D glucosamine.
7. Cocarboxylate of mono-D-glucosamine.
8. Cocarboxylate of bis-D-glucosamine.
9. Adenosine-triphosphate of mono-D-glucosamine.
10. Adenosine-triphosphate of bis-D-glucosamine.
11. Adenosine-triphosphate of tris-D-glucosamine.

No references cited.

LEWIS GOTTS, *Primary Examiner.*

E. L. ROBERTS, *Examiner.*

J. BROWN, *Assistant Examiner.*